United States Patent [19]

Rajagopal et al.

[11] 4,343,365
[45] Aug. 10, 1982

[54] ELECTRICALLY OPERATED HYDRAULIC POWER LIFT SYSTEM

[75] Inventors: Ganesh Rajagopal, Richardson, Tex.; Habil S. Basrai, Port Huron, Mich.

[73] Assignee: Ford Motor Company, Dearborn, Mich.

[21] Appl. No.: 166,731

[22] Filed: Jul. 7, 1980

[51] Int. Cl.³ .................................. A01B 63/111
[52] U.S. Cl. ................................ 172/4; 172/7; 172/9
[58] Field of Search ........................ 172/2–11; 37/DIG. 1, DIG. 19, DIG. 20

[56] References Cited

U.S. PATENT DOCUMENTS

| | | | |
|---|---|---|---|
| 4,077,475 | 3/1978 | Hino et al. | 172/7 |
| 4,132,272 | 1/1979 | Holloway et al. | 172/2 |
| 4,132,273 | 1/1979 | Mortonson et al. | 172/2 |
| 4,157,118 | 6/1979 | Suganami et al. | 172/7 |
| 4,221,266 | 9/1980 | Fardal | 172/4 |
| 4,282,933 | 8/1981 | Suganami et al. | 172/7 |

*Primary Examiner*—Vance Y. Hum
*Attorney, Agent, or Firm*—John J. Roethel; Clifford L. Sadler

[57] ABSTRACT

A control system for a tractor hydraulical power lift system having an electrohydraulic actuator (22) coupled to a main hydraulic valve (21), comprising a feedback electronic control circuit including a circuit for mathematically combining a plurality of transducer generated signals into a command signal. The command signal comprises the output signal of a first differential summing device (32) receiving a first input signal for a control handle transducer (24) from which is substracted a second input signal produced as the output of a signal mixer that combines input signals from a rockshaft transducer (25), a draft selector transducer (26) and a draft load transducer (27). The command signal and a signal from a transducer (28) coupled to the electrohydraulic actuator are fed into a differential summing device (49) that has as its output an error signal representing the actual and desired positions of an implement to be positioned by the power lift system. The control circuit includes a sample-and-hold unit (51) adapted to receive the error signal. Clock logic transmits the error signal at predetermined times as determined by a sampling frequency clock (52) from the sample-and-hold unit (51) to the electrohydraulic actuator.

5 Claims, 3 Drawing Figures

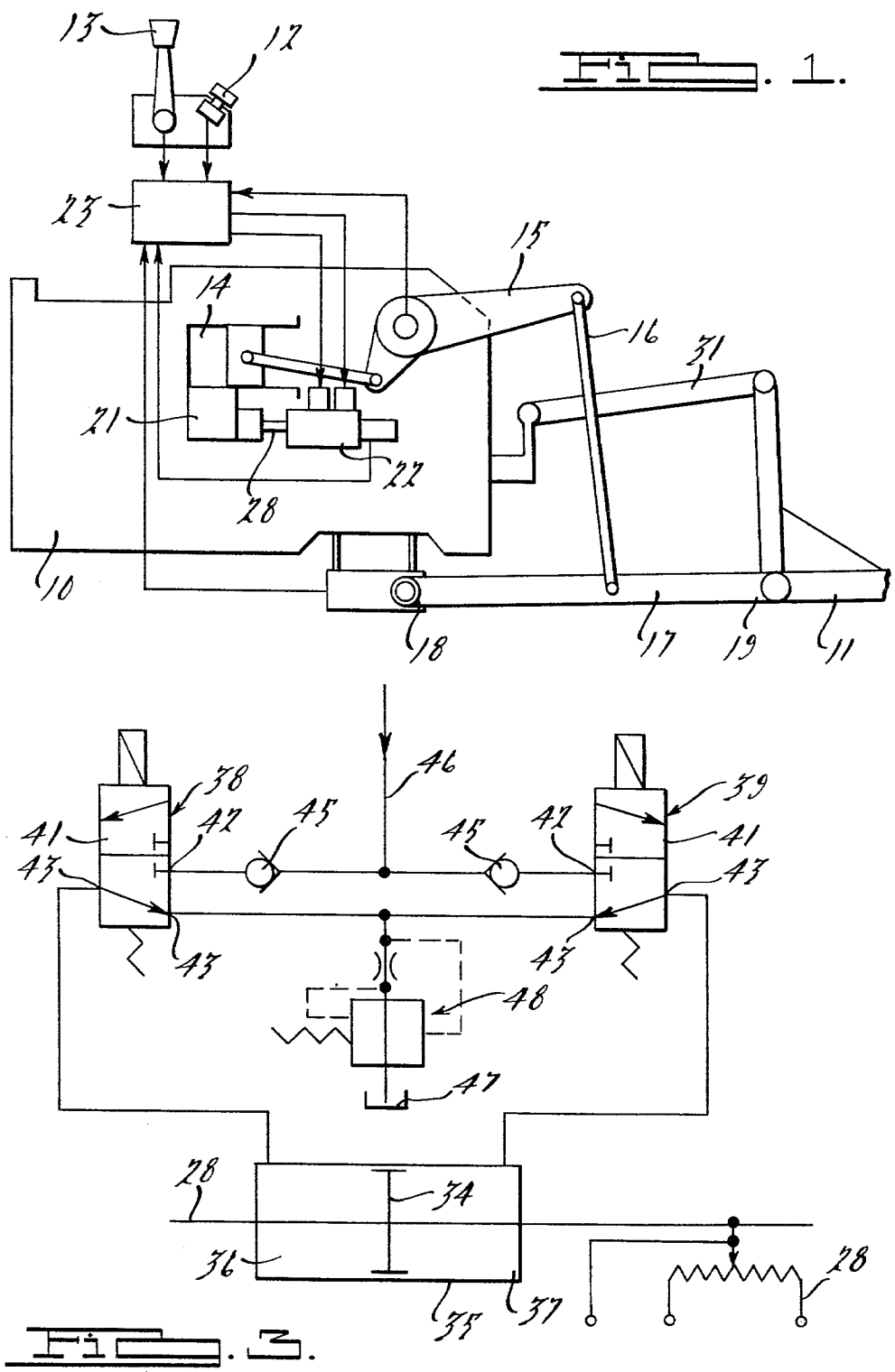

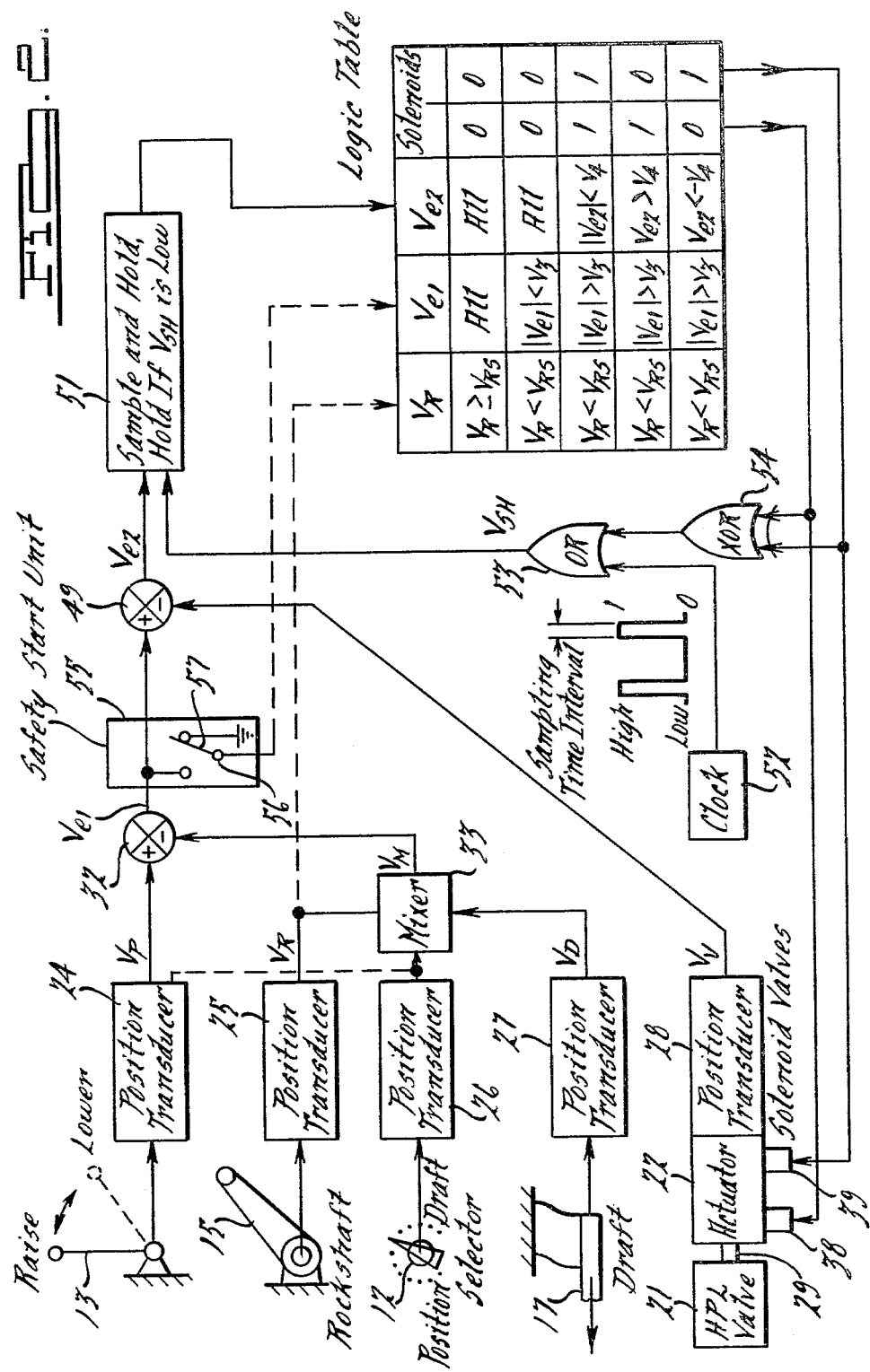

ELECTRICALLY OPERATED HYDRAULIC POWER LIFT SYSTEM

TECHNICAL FIELD

This invention relates to control systems for electrically operated hydraulic power lift systems associated with agricultural or industrial tractors, and more particularly to the electronic control of hydraulic functions to obtain a primary advantage of flexibility of location of components and controls not available with purely mechanical systems.

BACKGROUND OF THE INVENTION

Agricultural tractor draft controls traditionally have been hydromechanical systems, wherein implement draft is sensed mechanically and, through appropriate linkage, a hydraulic valve is actuated to raise and lower the implement. Mechanical linkage systems have an inherent limited flexibility that has been further reduced by the implementation of environmentally isolated cabs. The development of electronic microprocessors for automotive applications has provided design engineers flexibility for improving hydromechanical systems on industrial and agricultural equipment.

In an early known system for electronically controlling the draft or position of a tractor hitch mechanism, a pump supplies a directional control valve with hydraulic oil. The directional control valve controls a hydraulic cylinder which acts to control the position of the hitch through a linkage. By this means, an attachment or implement can be raised, held or lowered. In this known system, the actual position of the links is obtained with a position sensor and the draft load with a draft sensor. In an electronic control box, the sensor inputs are compared with the set nominal value. Corrections to match the depth setting at the operating panel are triggered electronically to the directional control valve and the hitch moves until the actual value of the sensors matches the nominal value setting.

More sophisticated systems are disclosed in U.S. Pat. No. 4,132,272 issued to Gale A. Holloway et al. for a "Tractor Hitch Position Control System", and U.S. Pat. No. 4,132,273 issued to Robert M. Mortonson et al. for a "Tractor Hitch Control System Having Safety Features", both patents being dated Jan. 2, 1979 and assigned to International Harvester Company.

The Holloway et al. patent discloses a main lift cylinder controlled by a spool valve which in turn is operated by a pilot cylinder. This pilot cylinder is controlled by a control valve that preferably includes a pair of poppet valve units each operated by one of a pair of solenoids. A potentiometer may be set so as to produce an output voltage corresponding to a desired vertical position of a rockshaft and hence of the tractor hitch. The rockshaft position is sensed by a second potentiometer and a third potentiometer senses the position of the spool valve controlling the flow of fluid to the main lift cylinder. An error signal is formed by a comparator circuit, the error signal corresponding to the difference between the desired and present positions of the rockshaft. The error signal and the spool valve position are operated upon by three error detecting circuits that operate in conjunction with the pilot valve to provide dead zones of operation. That is, the error signal must be a predetermined magnitude before the pilot signal is actuated.

The Mortonson et al. patent adds a modification to the Holloway et al. system in the form of a circuit that limits the amplitude of the error signal and which in turn effectively limits the velocity of downward movement of the rockshaft. A separate manually operated switch is provided for controlling the velocity-limiting operations.

The present invention provides an electrically operated hydraulic power lift system having an electronic control system that is capable of receiving and operating on a greater number of input variables in arriving at a decision resulting in control movement of the lift mechanism, and which includes a sample-and-hold circuit in a feedback circuit to increase the expected useful life of the solenoids in the system.

SUMMARY OF THE INVENTION

The present invention relates to a control system for a tractor hydraulic power lift system. The power lift system includes a hydraulic cylinder coupled to a rockshaft and linkage system for raising and lowering an implement supporting means, a source of fluid under pressure, and a main hydraulic valve means for controlling the flow of fluid to and from the hydraulic cylinder for regulating the up and down movement and the height of the implement supporting means. An electrohydraulic actuator having an operating member coupled to the main hydraulic valve means controls the operation of the latter.

The improvement embodied in the control system relates to the electronic circuit for directly controlling the electrohydraulic actuator and comprises a feedback electronic circuit including a circuit for mathematically combining a plurality of transducer generated signals into a command signal, a position transducer coupled to the operating member of the electrohydraulic actuator for generating a signal sensing the actual position of the operating means, and a differential summing device having as its inputs the command signal and the electrohydraulic actuator operating member position sensing signal. The output of the differential summing device comprises an error signal that represents the difference between the actual and desired positions of the implement.

An important feature of the feedback electronic circuit is a sample-and-hold circuit having as its input the error signal. A clock logic circuit controls the transmission of the error signal at predetermined times from the sample-and-hold circuit to the electrohydraulic actuator. The transmission of the error signal to the electrohydraulic actuator activates the latter to operate the main hydraulic valve to cause the hydraulic cylinder to move the rockshaft and its associated linkage system in implement raising or lowering direction, or to hold the implement at a fixed height.

DESCRIPTION OF THE DRAWINGS

Further features and advantages of the present invention will be made more apparent as this description proceeds, reference being had to the accompanying drawings, wherein:

FIG. 1 is a schematic diagram of an electrically operated hydraulic power lift system;

FIG. 2 is a schematic diagram of the feedback electronic control circuit for the power lift system; and FIG. 3 is an enlarged diagram of the electrohydraulic actuator preferably utilized in the power lift system.

DETAILED DESCRIPTION OF THE INVENTION

Referring now to the drawings, a schematic diagram of an electrically operated hydraulic power lift system is shown in FIG. 1 as applied to the rear end 10 of a tractor where implements 11 are commonly attached. When the selector 12 is in the position control mode, as will be more fully explained, the implement 11 position is determined by the position of the control handle 13. When the selector 12 is set at a draft position, the position of the implement 11 is controlled by both the position of the control handle 13 and the amount of draft load that is exerted on the tractor by the implement. For example, if the implement were a plow, the control handle 13 would be used to position the plow at a depth corresponding to a predetermined draft load within the power limits of the tractor. If the draft load were to increase due to denser soil conditions being encountered, the control system would lift the implement to decrease the plowing depth, thus decreasing the draft load from its original value. This ensures that the plowing operation will continue as close to optimum as possible.

A hydraulic cylinder 14 is used to move a rockshaft 15 coupled by a link 16 to the lower link 17 of the tractor. The lower link 17 extends in a generally horizontal direction and is pivoted at one end 18 to the tractor frame and at its other end 19 to the implement. Raising or lowering movements of the lower link results in corresponding raising or lowering of the implement 11.

Hydraulic oil flow to the cylinder 14 from a pump (not shown) is controlled by a main hydraulic valve 21 which is operated by an electrohydraulic actuator 22. The electrohydraulic actuator 22 in turn receives its inputs from an electronic control box 23.

Referring now to FIG. 2, there is shown schematically a feedback electronic control circuit contained within the electronic control box 23. Five transducers provide inputs to the control system from the following variables:

1. Transducer 24 sensing the position of the control handle 13;
2. Transducer 25 sensing the position of the rockshaft 15, the latter being directly proportional to the position of the implement;
3. Transducer 26 sensing the position of the selector knob 12, i.e., whether a knob 12 is in position mode control or in draft mode control or intermediate the two positions;
4. Transducer 27 sensing draft magnitude or load on the lower link 17; and
5. Transducer 28 sensing the position of the valve operating member 29 (see FIG. 3) of the electrohydraulic actuator 22.

The draft magnitude or load may be measured either by measuring the pull on the lower link 17, as described, or by measuring the force exerted at the top link 31.

Transducers 24, 25 and 26 preferably are rotary potentiometers and transducers 27 and 28 preferably are linear potentiometers.

In the feedback electronic control circuit, from two to four input signals may be mathematically combined to produce a command or control signal, depending on the control mode set in the selector 12. The command signal comprises the output $V_{e1}$ of a first differential summing device 32 that receives a first input signal $V_P$ from which is subtracted a second input signal $V_M$ from a mixer 33. The input signal $V_P$ is the signal produced by the transducer that senses the position of the operator actuated input handle for raising and lowering the implement 11 carried on the tractor implement supporting means.

With the selector 12 in the position control mode, the output $V_M$ of the mixer 33 is proportional only to the rockshaft 15 position. The control system compares the desired position $V_P$ of the rockshaft 15 as set by the control handle 13 with the actual rockshaft position $V_R$, as signaled by the position transducer 25, and then decides whether to lift or lower the implement by appropriately moving the hydraulic power lift control valve 21 proportionately to the error $V_{e1}$. This is done by means of the electrohydraulic proportional actuator 22 shown in enlarged detail in FIG. 3.

The actuator 22 comprises a double-acting spool type piston 34 contained in a cylinder 35 having at each end chambers 36 and 37. A pair of three-way solenoid valves 38 and 39 communicate with the cylinder chambers 36 and 37, respectively. Each solenoid valve has a valve body 41 having an actuator port 42, an inlet port 43, and an outlet port 44. The solenoids 38 and 39 control the flow of fluid through the valve bodies 41.

The valve inlet ports 43 are coupled through check valves 45 to a fluid pressure supply line 46. The return or outlet ports are coupled to each other with the fluid flow therefrom being routed to a sump 47 through a pressure compensated flow control valve 48.

In a neutral state, both of the solenoid valves 38 and 39 are off and the position of the actuator 22 is determined by a centering spring (not shown) in the main hydraulic valve 21. The centering spring positions the valve spool of the valve 21 so that no flow is possible to or from the main hydraulic lift cylinder. To move the actuator piston 34 to the right, as seen in FIGS. 1 and 3, solenoid valve 38 is turned on and solenoid valve 39 is turned off. To move the actuator piston to the left, solenoid valve 38 is turned off and solenoid valve 39 is turned on. The speed of the actuator piston is fixed by the pressure compensated flow control valve. Any position of the actuator 21 can be held by turning both solenoids on.

When the selector 12 is in an intermediate or draft position, as shown in FIG. 2, the mixer 33 receives two additional signals in addition to rockshaft position signal received from the transducer 25 when the implement 11 is being pulled through the soil. The output $V_M$ from the mixer 33 then becomes the mathematical combination of an input signal $-V_P$ from the position transducer 25 sensing the rockshaft position, an input signal $XV_R$ from the position transducer 26 sensing the draft position as set by the operator selector control knob 12, and an input signal $XV_D$ from a transducer 27 sensing the magnitude of a draft force on the link 27 (or 31) of the linkage system. That is, when the selector 12 is in an intermediate position, as shown in FIG. 2, the mixer 33 output $V_M$ is a linear function defined as follows:

$$V_M = V_R + XV_R + XV_D$$

where
$V_R$ = Output of rockshaft position transducer
$V_D$ = Output of draft transducer
$X$ = A fraction that can be varied from zero to 0.8 depending on the position of the selector.

When the selector is at the position control setting, the value of X is zero so that $V_M = -V_R$. The selector control is also used to feed a bias signal to the input handle position transducer 25 and associated electronics so that the handle is able to control the complete range of draft and position values without loss of sensitivity.

The position of the piston 34 of the actuator 22, and hence the main hydraulic valve 21, is measured by the position transducer 28, the output signal of which is designated $V_y$. Both the output $Ve_1$ of the first summing device 32 and the output $V_y$ of the position transducer are fed into a second differential summing device 49, the output of which, depending on the sign and magnitude of the difference ($Ve_1 - V_y$) is equal to $Ve_2$, results ultimately in the solenoid valves 38–39 being turned on or off so as to move the main valve 21 in either direction or to hold. The $Ve_2$ signal becomes the input to a sample-and-hold circuit 51 and is only released for solenoid activation at predetermined time intervals. That is, the control system utilizes a clock 52 to provide a sampling frequency at which decisions are to be made. During the sampling instant when the clock pulse is "high", the signal $Ve_2$ is passed through the sample-and-hold circuit to cause the activation of either or both the solenoids. The following logic table from FIG. 2 indicates how the decisions are made and will be explained next.

| $V_R$ | $Ve_1$ | $Ve_2$ | Solenoids | |
|---|---|---|---|---|
| $V_R \geq V_{RS}$ | All | All | 0 | 0 |
| $V_R < V_{RS}$ | $|Ve_1| < V_3$ | All | 0 | 0 |
| $V_R < V_{RS}$ | $|Ve_1| > V_3$ | $|Ve_2| < V_4$ | 1 | 1 |
| $V_R < V_{RS}$ | $|Ve_1| > V_3$ | $Ve_2 > V_4$ | 1 | 0 |
| $V_R < V_{RS}$ | $|Ve_1| > V_3$ | $Ve_2 < -V_4$ | 0 | 1 |

For Solenoids 1 is "ON" - 0 is "OFF"
$V_3$ sets neutral deadband
$V_4$ sets deadband outside of neutral The first row of the logic table indicates that both the solenoid valves 38–39 are turned off whenever the rockshaft 15 position $V_R$ exceeds or equals a certain present value $V_{RS}$. This returns the valve 21 to neutral and prevents any further raising of the rockshaft 15 or the implement 11. In the next four rows of the logic table, the rockshaft 15 is within its permissible operating range. In the second row, the solenoid valves 38–39 are both turned off corresponding to a neutral position for the main valve 21 when the magnitude of $Ve_1$ is within a present value $V_3$. This value is selected to be less than the mechanical deadband of the valve 21 in its neutral state. In the next three rows of the logic table, $Ve_1$ is outside this deadband. In the third row, the magnitude of $Ve_2$ is within a tolerance band $V_4$ and the system calls for both the solenoid valves to be on so that the position of the actuator 22 is held. In the fourth row of the logic table, $Ve_2$ is greater than $V_4$ and the control system calls for the valve operating member 28 of the actuator to move to the right. In the last row, $Ve_2$ is less than $-V_4$ and the control system calls for the actuator to move to the left.

The other elements in the control system, see FIG. 2, consisting of the OR gate 53, the exclusive OR gate (XOR) 54, and the sample-and-hold unit 51, are used to ensure that if during the clock period the actuator 22 reaches the desired position as indicated by solenoids 38 and 39 being both on or off, that position is held until the next sampling interval. This ensures that the solenoid valves 38–39 are turned on and off, at most, only once during each clock period. This results in an increased life cycle for the solenoid valves. The sampling frequency may be set at 20 $H_z$ which is sufficient for the hydraulic power lift system.

Since the implement 11 is locked either in the raised or lowered position with the engine shut off, the control handle or quadrant lever 13 may be inadvertently moved by the tractor operator, resulting in the control handle being at a different setting with respect to the rockshaft 15. To prevent any unexpected and possibly unsafe movement of the lift system and the implement when the tractor is again started, a safety start unit 55 is inserted in the control system. In FIG. 2, the safety start unit 55 is shown between the two summing devices 32 and 49. When the tractor is turned off, the safety start unit sets its output 56 to the logic table to zero by grounding it, as shown by the switch 57. When the tractor is restarted, this switch 57 continues to keep the $Ve_1$ input to the logic grounded until the $Ve_1$ coming out of the summing device 32 is zero. This condition is achieved when the input handle 13 is moved so that its position corresponds to the actual position of the rockshaft 15. Once the input handle and the rockshaft position have been synchronized, the start switch 57 unlatches and connects the $Ve_1$ coming out of the summing device 32 into the logic table. Until this happens, the two solenoid valves 38–39 are in the off position so that no movement of the implement 11 can take place. After Synchronization, the state of the start switch does not change until the tractor is turned off.

The advantages of an electrohydraulic power lift system are:

1. It uses simple on/off three-way solenoid valves which are inexpensive and relatively insensitive to dirt.

2. It provides proportional control; the valve displacement is proportional to the difference between desired and actual values of the controlled variable.

3. It may be used in either closed-center or open-center hydraulic system.

4. It may be fitted to current mechanical/hydraulic systems where space is available to mount the proportional electrohydraulic actuator, i.e., it can be offered as an option with no major investments in tooling of existing designs.

5. The life of the solenoid valves is extended by limiting the maximum sampling frequency in the control system. The solenoid valves are turned off when the actuator is at the neutral position.

6. In tractors with enclosed cabs, the electrohydraulic power lift system will help reduce noise levels due to the use of noise-tight electrical connectors. It will also save time during assembly and disassembly of cabs from tractors since only one electrical connector would have to be connected or disconnected.

Other advantages, some of which are of particular importance to agricultural tractors, include:

Elimination of openings, in cab floors, required for linkages, resulting in lower noise levels.

Reduced control efforts; can be designed to any value desired.

Compact packaging, design and convenience of location of controls making available a bigger space for the operator. This improves the feasibility of installation of wider seats with swivel capability.

Increased alternates for draft sensors; not limited to top-link, lower-link or driveline torque monitor, but can be wheel slip, engine speed, engine load, etc.

Control adjustments and most service items are mounted externally for improved service.

It is to be understood that this invention is not limited to the exact construction illustrated and described above, but the various changes and modifications may be made without departing from the spirit and scope of the invention as defined in the appended claims.

We claim:

1. A control system for a tractor hydraulic power lift system that includes a hydraulic cylinder coupled to a rockshaft and linkage system for raising and lowering an implement supporting means, a source of fluid under pressure, a main hydraulic valve means for controlling the flow of fluid to and from the hydraulic cylinder for regulating the height of the implement supporting means, and an electrohydraulic actuator having an operating member coupled to the main hydraulic valve means for operating the latter;

the control system comprising:

a feedback electronic control circuit including circuit means for mathematically combining a plurality of transducer means generated signals into a command signal;

the command signal comprising the output of a first differential summing device that receives a first input signal produced by a position transducer sensing the position of an operator actuated input handle for raising and lowering of an implement carried on the implement supporting means and substracts therefrom a second input signal produced as the output of a signal mixer that combines input signals from a position transducer means sensing the rockshaft position, a position transducer means sensing the draft position as set by an operator selector control knob and a transducer means sensing the magnitude of a draft force on a link of the linkage system;

a position transducer means coupled to the operating member of the electrohydraulic actuator for generating a signal sensing the actual position of the operating member;

a second differential summing device having as its inputs the command signal and the electrohydraulic actuator operating member position sensing signal and as its output an error signal representing the difference between the actual and desired positions of the implement;

a sample-and-hold circuit having an input to receive the error signal;

a clock logic means for transmitting the error signal at predetermined time intervals from the same-and-hold circuit to the electrohydraulic actuator to activate the latter to operate the main hydraulic valve to cause the hydraulic cylinder to move the rockshaft and linkage system in implement raising or lowering direction or to hold the implement at a fixed height, the clock logic means including a clock means and a logic circuit having a plurality of inputs one of which is the output of the sample-and-hold circuit, a second of which is the output of the position transducer coupled to the rockshaft, and the third of which is an interruptible output of the first differential summing device;

and wherein the interruptible output of the first differential summing device is coupled to the logic circuit through a switch responsive to de-energization or re-energization of an ignition circuit of a tractor;

the switch having a latch means operable in response to de-energization of the ignition circuit that sets the switch output to the logic circuit to zero by grounding it;

the switch being adapted to maintain the output of the first differential summing device to the logic circuit at zero until the operator places the input handle in a position corresponding to the actual position of the rockshaft causing the output of the first differential summing device to become zero upon which the switch latch unlatches permitting the first differential summing device output to be coupled to the logic circuit.

2. A control system according to claim 1, in which:

the logic circuit corresponds to the following logic table:

| $V_R$ | $V_{e_1}$ | $V_{e_2}$ | Solenoids | |
|---|---|---|---|---|
| $V_R \geq V_{RS}$ | All | All | 0 | 0 |
| $V_R < V_{RS}$ | $\|V_{e_1}\| < V_3$ | All | 0 | 0 |
| $V_R < V_{RS}$ | $\|V_{e_1}\| > V_3$ | $\|V_{e_2}\| < V_4$ | 1 | 1 |
| $V_R < V_{RS}$ | $\|V_{e_1}\| > V_3$ | $V_{e_2} > V_4$ | 1 | 0 |
| $V_R < V_{RS}$ | $\|V_{e_1}\| > V_3$ | $V_{e_2} < -V_4$ | 0 | 1 | in which for the solenoids: 1 is "ON", 0 is "OFF", $V_3$ sets the neutral deadband for the main valve, and $V_4$ sets the deadband outside neutral;

the logic circuit producing digital output signals for activating the solenoids in accordance with predetermined conditions relating to the neutral deadband and the deadband outside of the neutral zone.

3. A control system for a tractor hydraulic power lift system that includes a hydraulic cylinder coupled to a rockshaft and linkage system for raising and lowering an implement supporting means, a source of fluid under pressure, a main hydraulic valve means for controlling the flow of fluid to and from the hydraulic cylinder for regulating the height of the implement supporting means, and an electrohydraulic actuator for operating the main hydraulic valve, the electrohydraulic actuator having a double-acting spool type piston assembly coupled to the main hydraulic valve and a pair of three-way solenoid valves for controlling movement of the piston assembly in opposite directions;

the control system comprising:

a feedback electronic control circuit including circuit means for mathematically combining a plurality of transducer means generated signals into a command signal;

the command signal comprises the output $V_{e_1}$ of a first differential summing device that receives a first input signal $V_P$ produced by a position transducer sensing the position of an operator actuated input handle for raising and lowering of an implement carried on the implement supporting means and subtracts therefrom a second input signal produced as the output $V_M$ of a signal mixer that combines an input signal $-V_R$ from a position transducer means sensing the rockshaft position, an input signal $XV_R$ from a position transducer means sensing the draft position as set by an operator control knob with X being a fraction that can be varied from zero to 0.8 depending on the selector knob position, and an input signal $XV_D$ from a transducer means sensing the magnitude of a draft force on a link of the linkage system;

a position transducer means coupled to the operating member of the electrohydraulic actuator for generating a signal $V_V$ sensing the actual position of the electrohydraulic actuator piston assembly;

a second differential summing device having as its inputs the command signal $V_{e1}$ and the electrohydraulic actuator operating member position sensing signal $V_V$ and as its output an error signal $V_{e2}$ representing the difference between the actual and desired positions of the implement;

a sample-and-hold circuit having an input to receive the error signal $V_{e2}$;

a clock logic means for transmitting the error signal $V_{e2}$ at predetermined time intervals from the sample-and-hold circuit to the electrohydraulic actuator solenoids to activate the actuator to operate the main hydraulic valve to cause the hydraulic cylinder to move the rockshaft and linkage system in implement raising or lowering direction or to hold the implement at a fixed height, the clock logic means including a clock means and a logic circuit having a plurality of inputs one of which is the output of the sample-and-hold circuit, a second of which is the output of the position transducer coupled to the rockshaft, and the third of which is an interruptible output of the first differential means;

and wherein the interruptible output of the first differential summing device is coupled to the logic circuit through a switch responsive to de-energization or re-energization of an ignition circuit of a tractor;

the switch having a latch means operable in response to de-energization of the ignition circuit that sets the switch output to the logic circuit to zero by grounding it;

the switch being adapted to maintain the output of the first differential summing device to the logic circuit at zero until the operator places the input handle in a position corresponding to the actual position of the rockshaft causing the output of the first differential summing device to become zero upon which the switch latch unlatches permitting the first differential summing device output to be coupled to the logic circuit.

4. A control system according to claim 3, in which:

the clock means provides a sampling frequency coupled through an "OR" gate to an input of the sample-and-hold circuit;

the output of the "OR" gate comprising a sample-and-hold circuit input control signal $V_{SH}$;

the sample-and-hold circuit passing the $V_{e2}$ signal when the $V_{SH}$ signal is in a logic "1" state and retaining the last value of $V_{e2}$ when the $V_{SH}$ returns to a logic "0" state;

during a sampling instant, when the clock means sampling frequency pulse is high or in a logic "1" state, the control system operates to turn either solenoid valve of the electrohydraulic actuator on or off so as to move the piston in either direction or to hold the piston at a desired position until the next sampling instant.

5. A control system according to claim 4, in which:

the logic circuit has two outputs coupled in parallel to each solenoid and the inputs of an "EXCLUSIVE-OR" gate;

the output of the "EXCLUSIVE-OR" gate being coupled to the second input of the "OR" gate;

the "EXCLUSIVE-OR" gate maintaining the sample-and-hold circuit open continuously when the actuator piston is to be moved over a fairly broad range.

* * * * *